United States Patent [19]

Gaiser

[11] 4,194,641
[45] Mar. 25, 1980

[54] TWO-PIECE BLOW MOLDED CONTAINER WITH HANDLE

[75] Inventor: William R. Gaiser, Dayton, Ohio

[73] Assignee: The Broadway Companies, Inc., Dayton, Ohio

[21] Appl. No.: 942,891

[22] Filed: Sep. 18, 1978

[51] Int. Cl.² .............................................. B65D 23/10
[52] U.S. Cl. .............................................. 215/100 A
[58] Field of Search ............. 215/100 A, 100 R, 12 R

[56] References Cited

U.S. PATENT DOCUMENTS

| D. 162,147 | 2/1951 | Fuerst | 215/100 A UX |
|---|---|---|---|
| 2,959,812 | 11/1960 | Allen | 215/12 R X |
| 3,000,527 | 9/1961 | Jennings | 215/100 A |
| 3,140,329 | 7/1964 | Nutting | 264/242 |
| 3,404,795 | 10/1968 | Kemp | 215/100 A |

Primary Examiner—Donald F. Norton
Attorney, Agent, or Firm—Biebel, French & Nauman

[57] ABSTRACT

A preform having a neck portion and a tubular body is inserted into a prefabricated attachment ring having a centrally located opening therein smaller than the preform neck in a mold cavity. The attachment ring has a handle integrally attached thereto. The preform body is blow molded and expands to form a container. During expansion, the preform and attachment ring become interlocked to form a two-piece container having a handle.

6 Claims, 3 Drawing Figures

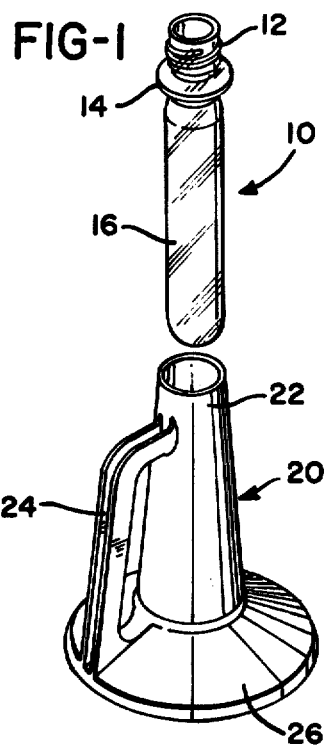
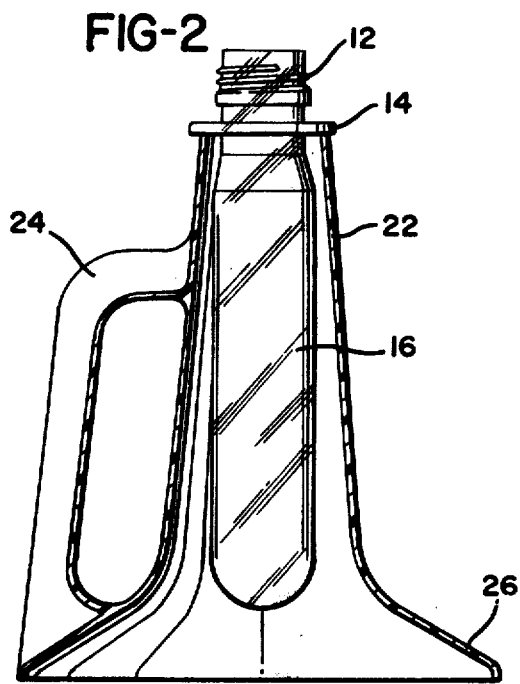
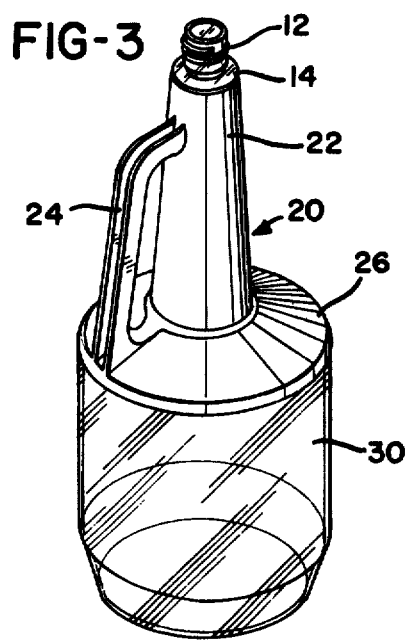

TWO-PIECE BLOW MOLDED CONTAINER WITH HANDLE

BACKGROUND OF THE INVENTION

This invention relates to blow molding articles from a thermoplastic material and more particularly to an improved two-piece construction of a blow molded container with handle.

Bottles and other containers are conventionally blown from thermoplastic materials such as polyethylene, polypropylene, polyethylene terephthalate, and polyvinyl chloride. As an initial step in the manufacturing process, a preform is formed either by injection molding or by extruding a thermoplastic material into a hollow tube and blowing the extrusion into a preform. This preform is then transferred to a blow mold cavity where it is expanded to its final shape. However, problems have arisen when attempts have been made to blow mold containers having handles attached thereto.

When handles are integrally formed on the container during the blow molding procedure, a more complex molding cavity is required and problems such as poor material distribution in the final container, misalignment of the preform in the mold, welding failures, and difficulties in molding fast setting plastics such as polyvinylchloride have arisen. Uhlig, U.S. Pat. No. 3,983,199, describes in detail the problems associated with blow molding containers with integral handles. If the choice is made to separately attach a handle to a container after the blow molding operation is completed, different problems arise. Separately attached handles require an assembly operation which increases both the time and labor required to produce a finished article. Additionally, the handle must be securely attached to the container so that it will not separate from it at a later time.

As can be seen from the above discussion there is a need in the art for a method of producing blow molded containers having handles attached thereto which avoids the prior art problems and yet does not add substantially to the time and expense required to produce such a container.

SUMMARY OF THE INVENTION

The blow molded container with handle of the present invention initially consists of two pieces, an attachment ring having a handle as an integral part thereof and a preform having a threaded neck, flange, and tubular body. In a blow mold cavity, the preform is inserted into a hollow neck portion of the attachment ring which is positioned in the cavity. The flange on the preform is larger than the hollow neck on the attachment ring and seats the preform with its threaded neck exposed and its tubular body extending through the hollow neck portion of the attachment ring. The mold is then closed and the preform heated and pressurized from its interior which causes it to expand to the desired final container size while at the same time locking itself to the attachment ring.

Preferably, both the attachment ring and the preform are fabricated from the same thermoplastic, although each may be of a different material. If the same material is used, the empty container can be easily and fully reclaimed. Additionally when food products or beverages are to be packaged in the finished container, use of polyethylene terephthalate is preferred. Since the attachment ring is unaffected by the final blow molding operation, it may be preprinted or otherwise predecorated prior to the final blow molding operation.

Accordingly, it is an object of this invention to provide a simple and inexpensive method of attaching handles to blow molded containers, and also to produce an inexpensive yet sturdy blow molded container having a securely attached handle.

These and other objects and advantages of the invention will be apparent from the following description, the accompanying drawings, and the appended claims.

BRIEF DESCRIPTION OF THE DRAWINGS

FIG. 1 is a perspective view of the preform with threaded end, flange, and tubular body and the attachment ring with hollow neck and handle attached thereto;

FIG. 2 is a side view illustrating the manner in which the preform and attachment ring will fit together in the mold cavity prior to the final blow molding operation, with the final container shape being shown by broken lines; and FIG. 3 is a perspective view of the finished blow molded container

DESCRIPTION OF THE PREFERRED EMBODIMENTS

Both the preform and attachment ring of the present invention may be fabricated by any conventional process in the art such as injection molding. Either or both may be fabricated of thermoplastic materials such as polyethylene, polypropylene, polyethylene terephthalate, and polyvinylchloride. Preferably, both the preform and attachment ring are fabricated from the same material although they may be of different thermoplastic materials, if so desired. When the finished container is to be used to package food products or beverages, polyethylene terephthalate is the preferred material for both the preform and the attachment ring.

Referring to FIG. 1, preform 10 is fabricated so that it has a threaded end portion 12 and a tubular body 16 separated by a laterally extending flange 14. Although in its preferred form as shown the preform has a threaded end portion with a flange, other neck constructions are possible. For example, the neck portion of the preform may be designed with a wide neck which tapers into a narrower tubular body and which is adapted to be inserted a predetermined distance into neck portion 22 of attachment ring 20. Other possible constructions will be apparent to those skilled in the art.

When preform 10 is fabricated, both the threaded end portion 12 and flange 14 are made so that neither requires any further modification during the blow molding step of the process. That is, threaded end portion 12 is sized to fit and provide a seat for a screw cap and seal during its initial forming step (such as an injection molding step) rather than being modified during the blow molding step. Likewise, the preform is fabricated with laterally extending flange 14 which is sized to snugly fit over the neck portion of the attachment ring as will be explained below. Only the tubular body 16 is affected during the blow molding step of the process.

Attachment ring 20 is fabricated with a conical neck portion 22 which flares outwardly into a disc-shaped portion 26. Handle 24 is integrally attached at each of its ends to neck portion 22 and disc-shaped portion 26, respectively.

Referring now to FIG. 2, it can be seen that tubular body 16 of preform 10 is designed to be able to fit inside neck portion 22 of attachment ring 20. Flange 14 serves to correctly position perform 10 within attachment ring 20 in the mold cavity. The sequence of steps in the blow molding operation is as follows. The attachment ring is loaded into the mold cavity first, and the mold is then closed. The preform is loaded onto a mandrel which is used to guide the preform through a collar in the mold to its proper position with flange 14 or preform 10 resting on neck portion 22 of attachment ring 20. The preform may be preheated just prior to insertion into the mold, heated while in the mold, or a combination of the two. After the preform has been heated, a pressurized gas such as air if forced through a gas passage in the mandrel, as is conventional in the art, and the preform is expanded to fill the mold cavity. As the preform expands, it is automatically locked onto the attachment ring. Once the container is expanded to its final shape, the mold is opened and the container ejected from it. This may be accomplished by a burst of gas from the gas passageway in the mandrel, freeing the container from the mold and mandrel.

The finished container, as shown in FIG. 3, requires no further assembly steps. Tubular body 16 of the preform has been expanded to the desired final container shape 30 and is locked into place with attachment ring 20 by flange 14 at neck 22 and due to its expansion under disc-shaped portion 26 of the attachment ring. Threaded end 12, unaffected by the blow molding operation, remains ready to receive a screw cap or other sealing means after the container has been filled.

A further advantage of the present invention is that since the attachment ring is unaffected by the blow molding operation, it may be preprinted or otherwise predecorated prior to loading into the mold cavity. Thus, once the expanded container leaves the mold, it is immediately ready to be filled, sealed, and packaged.

While the apparatus and methods herein described constitute preferred emobodiments of the invention, it is to be understood that the invention is not limited to these precise apparatus and methods, and that changes may be made in either without departing from the scope of the invention, which is defined in the appended claims.

What is claimed is:

1. In a container blow molded from a preform having a neck and a tubular body which is expanded from the preform in the blow molding operation, the improvement comprising:
    an attachment ring surrounding the upper portion of said body adjacent said neck, including means for locking said ring to said body when said preform is expanded, and
    a handle formed as an integral part of said ring.

2. The container of claim 1 where both the preform and ring are fabricated of a thermoplastic material.

3. The container of claim 2 where said thermoplastic material is polyethylene terephthalate.

4. The container of claims 1, 2, or 3, where the neck of the preform comprises a threaded end portion and a flange adapted to seat said body in proper position in said ring.

5. The container of claims 1, 2, or 3, where said ring comprises a conically shaped neck portion having a central opening therein, said neck portion flaring outwardly to form a disc-shaped portion at the base of said neck.

6. In a container blow molded from a preform having a neck and tubular body which is expanded from the preform in the blow molding operation, the improvement comprising:
    a laterally extending flange separating said neck and said body,
    an unexpanded attachment ring surrounding the upper portion of said body adjacent said flange and including a central opening smaller than said flange, whereby said ring becomes interlocked to said body upon expansion of said preform into a container, and
    a handle formed as an integral part of said ring.

* * * * *